Figures 1, 2:
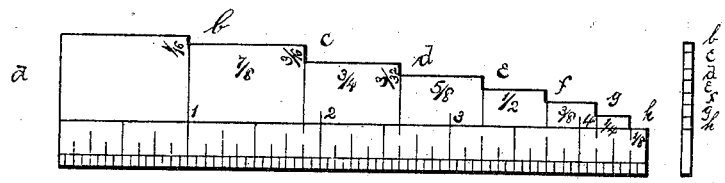

No. 697,701. Patented Apr. 15, 1902.
A. E. AYER.
MACHINIST'S SCALE.
(Application filed Oct. 31, 1901.)

(No Model.)

Witnesses:
G. Edward Uchus
H. E. Perkins

Inventor:
Albert E. Ayer
by Louis C. Harriman,
Attorney.

UNITED STATES PATENT OFFICE.

ALBERT E. AYER, OF EAST BOSTON, MASSACHUSETTS, ASSIGNOR OF ONE-HALF TO HERBERT B. NEWTON, OF HAVERHILL, MASSACHUSETTS.

MACHINIST'S SCALE.

SPECIFICATION forming part of Letters Patent No. 697,701, dated April 15, 1902.

Application filed October 31, 1901. Serial No. 80,645. (No model.)

*To all whom it may concern:*

Be it known that I, ALBERT E. AYER, a citizen of the United States, and a resident of East Boston, in the county of Suffolk and State of Massachusetts, have invented certain new and useful Improvements in Machinists' Scales, of which the following is a specification.

It is well known to any machinist that it is extremely difficult to ascertain whether a part which he is making is exactly the correct size or not by measuring it with an ordinary scale where the graduation-marks must be relied on. It is also well known that it is quite difficult to set a pair of calipers to an exact size by means of the graduations on a scale and that standard gages are usually employed for the purpose where ordinary accuracy is necessary. The reason for this is that the graduation-marks must be of material width to be readily seen, and it is therefore difficult to see if the surface to be measured or the instrument to be set comes to the middle of the mark. Moreover, a strong light and careful inspection is necessary in any event.

As machine-shops are ordinarily provided with but comparatively few sets of standard gages, which are kept in the tool-room, these gages cannot be conveniently used for general purposes, and, moreover, the ordinary male and female gages cannot be used to measure distances without using a caliper which is first set by the gage.

The object of my invention is to so construct an ordinary steel scale that its use will enable a mechanic to readily and accurately measure certain standard lengths without the aid of calipers and gages and to provide a series of gages in one instrument by which calipers may be readily set with sufficient accuracy for ordinary purposes. I carry out this object in the manner hereinafter described, and disclosed in the accompanying drawings, in which—

Figure 1 is a side view of a scale which is provided with my invention. Fig. 2 is an end view thereof.

The scale $a$ preferably consists of a flat strip of steel having one edge straight and graduated in any well-known manner, as shown. The opposite edge of the scale is provided with a series of perpendicular steps or shoulders $b$, $c$, $d$, $e$, $f$, $g$, and $h$, each two of which are certain different standard distances apart, the edge of the scale between each two shoulders being parallel to the graduated edge. As shown in the drawings, the distance between the first shoulder $b$ and the adjacent end of the scale is precisely one inch, while the distance to the next shoulder $c$ is seven-eighths of an inch. The distance between shoulders $c$ and $d$ is three-fourths of an inch, and the distance between each successive shoulder and the next is successively reduced one-eighth of an inch, the distance between the last notch and the end being one-eighth of an inch. The depth of the shoulders may also be made to correspond with still different fractions of an inch, if desired, as indicated; but as it is not desirable to increase the usual width of the scale to any material extent these sizes are necessarily confined to small variations and short lengths.

From the foregoing description it will be apparent that I have produced a form of scale which may be used with especial convenience for standard "outside" measurements. For example, if the mechanic is to make a part seven-eighths of an inch long he places the shoulder $b$ against one end of it and sees if the next shoulder $c$ comes to the other end. Where the ends of the parts are square, he may hold a flat piece against the end next to the shoulder $c$ and observe if this shoulder comes against the flat piece. This latter method may be adopted with special convenience where the light is poor. The manner in which the scale may be used for setting either "inside" or "outside" calipers will be obvious. It will be observed that a line is made across the scale from each shoulder to the graduations on the edge, so that the distance from one end of the scale to a particular shoulder may be readily determined. By providing the graduations in conjunction with the shoulders a scale is produced which has practically, in the instance shown in the drawings, eight different lengths. For example, if an outside caliper were to be set at one and seven-eighths inch the arms of the caliper would be adjusted so that they engaged the end of the scale where the graduations begin and the shoulder c. In measuring anything from the end to a shoulder the scale would be simply laid flat instead of on edge. It will therefore be observed that the combination of the graduations and shoulders constitute an important feature of my invention. In the particular form of scale shown in the drawings eighteen or more different gages are provided on a metal scale of comparatively small size; but it will be apparent that the sizes and number of these gages may be varied as desired, and it is immaterial whether these gages are formed in multiples of tenths or twelfths of an inch or according to the metric system.

I am aware that prior to my invention a fixed caliper has been produced having a regular series of shoulders on one leg and a straight-edge projection for the other leg; but this device can only be used in a very limited way, while my device may be conveniently used in numerous instances where said prior device is useless.

Having described my invention, what I claim as new, and desire to secure by Letters Patent of the United States, is as follows:

1. A machinist's scale having a longitudinal straight edge which is provided with a regular series of standard graduations, a series of steps arranged along the opposite longitudinal edge, each step consisting of two edge sections, one of which is parallel to one end of the scale and perpendicular to the graduated edge, and to the other edge section, each of the latter edge sections being of a length expressed in standard units by a recognized coefficient suitably indicated by markings on the scale.

2. A scale having a regular series of graduations along one edge, the opposite edge of the scale being provided with a series of steps or shoulders which are different standard distances apart, the sections of the edge between each shoulder being parallel to the edge on which the graduations are formed, and the distances between each shoulder and one end of the scale being indicated by the graduations to which they correspond at appropriate points.

3. A machinist's scale having a series of steps arranged along the entire length of one longitudinal edge, each step consisting of two edge sections, one of which is parallel to the widest end of the scale and perpendicular to the other edge section, each of the latter edge sections being of a length different from the others, and expressed in standard units by a recognized coefficient suitably indicated by markings on the scale.

In testimony whereof I have affixed my signature in presence of two witnesses.

ALBERT E. AYER.

Witnesses:
LOUIS H. HARRIMAN,
GEORGE E. UCKER.